US007280761B2

(12) United States Patent
Aono

(10) Patent No.: US 7,280,761 B2
(45) Date of Patent: Oct. 9, 2007

(54) DEVICE AND METHOD FOR SETTING ADD SIGNAL LEVEL FOR OADM SYSTEM

(75) Inventor: Yoshiaki Aono, Miyagi (JP)

(73) Assignee: NEC Corporation, Tokyo (JP)

( * ) Notice: Subject to any disclaimer, the term of this patent is extended or adjusted under 35 U.S.C. 154(b) by 904 days.

(21) Appl. No.: 10/100,919

(22) Filed: Mar. 20, 2002

(65) Prior Publication Data

US 2002/0135839 A1  Sep. 26, 2002

(30) Foreign Application Priority Data

Mar. 21, 2001  (JP)  ............................ 2001-079653

(51) Int. Cl.
*H04J 14/02* (2006.01)
(52) U.S. Cl. ..................... 398/94; 398/83; 398/84; 398/85; 398/82; 398/79; 398/177; 398/25; 398/38; 385/24; 385/37; 385/140
(58) Field of Classification Search ............ 398/25–48, 398/83, 79, 82, 94, 84, 85, 177; 385/24; 385/140, 37
See application file for complete search history.

(56) References Cited

U.S. PATENT DOCUMENTS 5,917,623 A  6/1999  Yoshida 6,701,087 B2 *  3/2004  Beine et al. ............... 398/38
6,904,241 B2 *  6/2005  DeGrange et al. ........ 398/83
6,944,401 B2 *  9/2005  Olier et al. ................ 398/94

FOREIGN PATENT DOCUMENTS

| EP | 0 734 129 A2 | 9/1996 |
|---|---|---|
| EP | 1 089 477 A2 | 4/2001 |
| EP | 1 176 747 A1 | 1/2002 |
| JP | 10-150433 | 6/1998 |
| JP | 10-163963 | 6/1998 |
| JP | 11-008590 | 1/1999 |
| JP | 11-275007 | 10/1999 |
| WO | WO 02/063811 A2 | 2/2002 |

* cited by examiner

*Primary Examiner*—Hanh Phan
(74) *Attorney, Agent, or Firm*—McGinn IP Law Group, PLLC

(57) ABSTRACT

An optical level calculator calculates optical powers of individual wavelengths of a through wavelength division multiplexed signal based on an input level monitor, network information, and insertion loss information 5, and obtains an optimum level for an add signal. An optical level controller controls a power of the add optical signal to the optimal level based on the calculated result, and multiplexes the through wavelength division multiplexed signal and the add optical signal.

30 Claims, 6 Drawing Sheets

DEVICE AND METHOD FOR SETTING ADD SIGNAL LEVEL FOR OADM SYSTEM

BACKGROUND OF THE INVENTION

1. Technical Field of the Invention

The present invention relates to a device and a method for setting an add signal level for an OADM (Optical Add-Drop Multiplexer) system, and specifically relates to a device and a method for an OADM system for setting a power of add signal light according to optical powers of individual wavelengths of an input wavelength division multiplexed signal in an OADM system for wavelength division multiplexed transmission.

2. Description of the Prior Art

FIG. 1 shows an example of a conventional OADM system. The conventional OADM system 50 is constituted while including a demultiplexer 51 for demultiplexing a wavelength division multiplexed signal into individual waves, optical switches 52 (52-1 to 52-n: n is a positive integer) for selecting whether adding a signal from outside or dropping the signal to outside, level monitors 53 (53-1 to 53-n) for monitoring levels of the individual optical signals, optical level controllers 54 (54-1 to 54-n) for controlling the levels of individual optical signals, and a multiplexer 55 for multiplexing the individual optical signals after the level control, for example.

The demultiplexer 51 demultiplexes the entire input wavelength division multiplexed signal into the individual waves, the level monitors 53 monitors the levels of all of the add signals and the drop signals, and the optical level controllers 54 control the individual waves such that all of the waves are at the same level.

However, because this method requires the level monitor and the optical level controller for an additional wavelength as the number of multiplexed waves increases, and a circuit scale and the number of parts become large as a result, there is a problem that the cost becomes high, and a failure rate becomes high. Further, the number of through wavelength division multiplexed signals tend to become larger than the number of add optical signals.

SUMMARY OF THE INVENTION

The object of the present invention is to provide a device and a method for setting an add signal level for an OADM which can reduce the scale of a circuit and the number of parts.

An add signal level setting device for an OADM (Optical Add-Drop Multiplexer) according to the present invention comprises an optical level calculator for calculating optical levels of individual wavelengths of an input wavelength division multiplexed signal without demultiplexing into the individual wavelengths, and an optical level controller for controlling an optical level of an add signal according to the calculated optical levels of individual wavelengths.

An add signal level setting method for an OADM (Optical Add-Drop Multiplexer) according to the present invention comprises steps of calculating optical levels of individual wavelengths of an input wavelength division multiplexed signal without demultiplexing into the individual wavelengths, and controlling an optical level of an add signal according to the calculated optical levels of individual wavelengths.

Because the present invention calculates the optical levels of individual wavelengths of input wavelength division multiplexed signal without demultiplexing into the individual wavelengths, it is possible to reduce the scale of circuit and the number of parts.

DETAILED DESCRIPTION OF THE PREFERRED EMBODIMENTS

Figure 1:
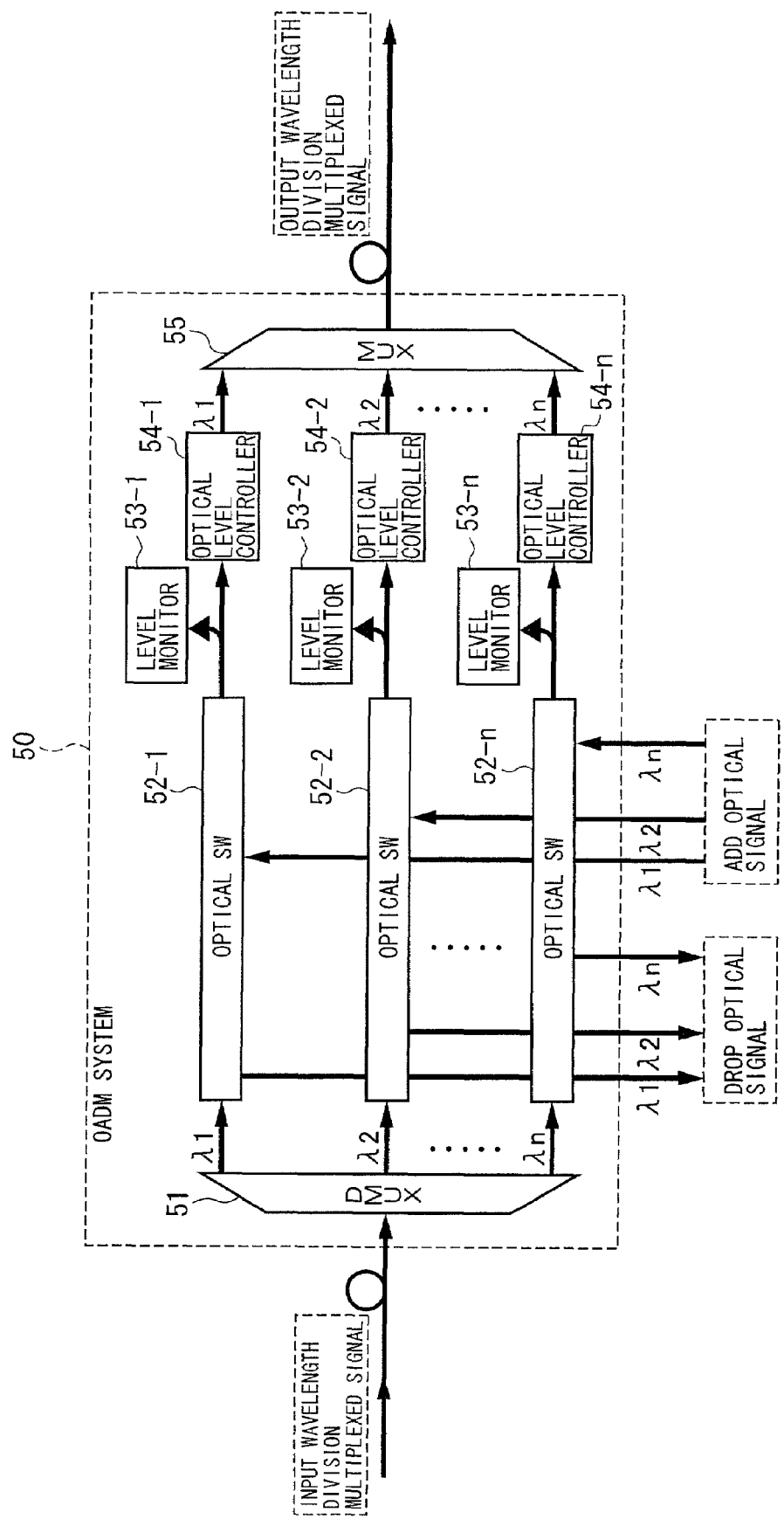
FIG. 1 is a block diagram for showing an example of a conventional OADM system.
Figure 2:
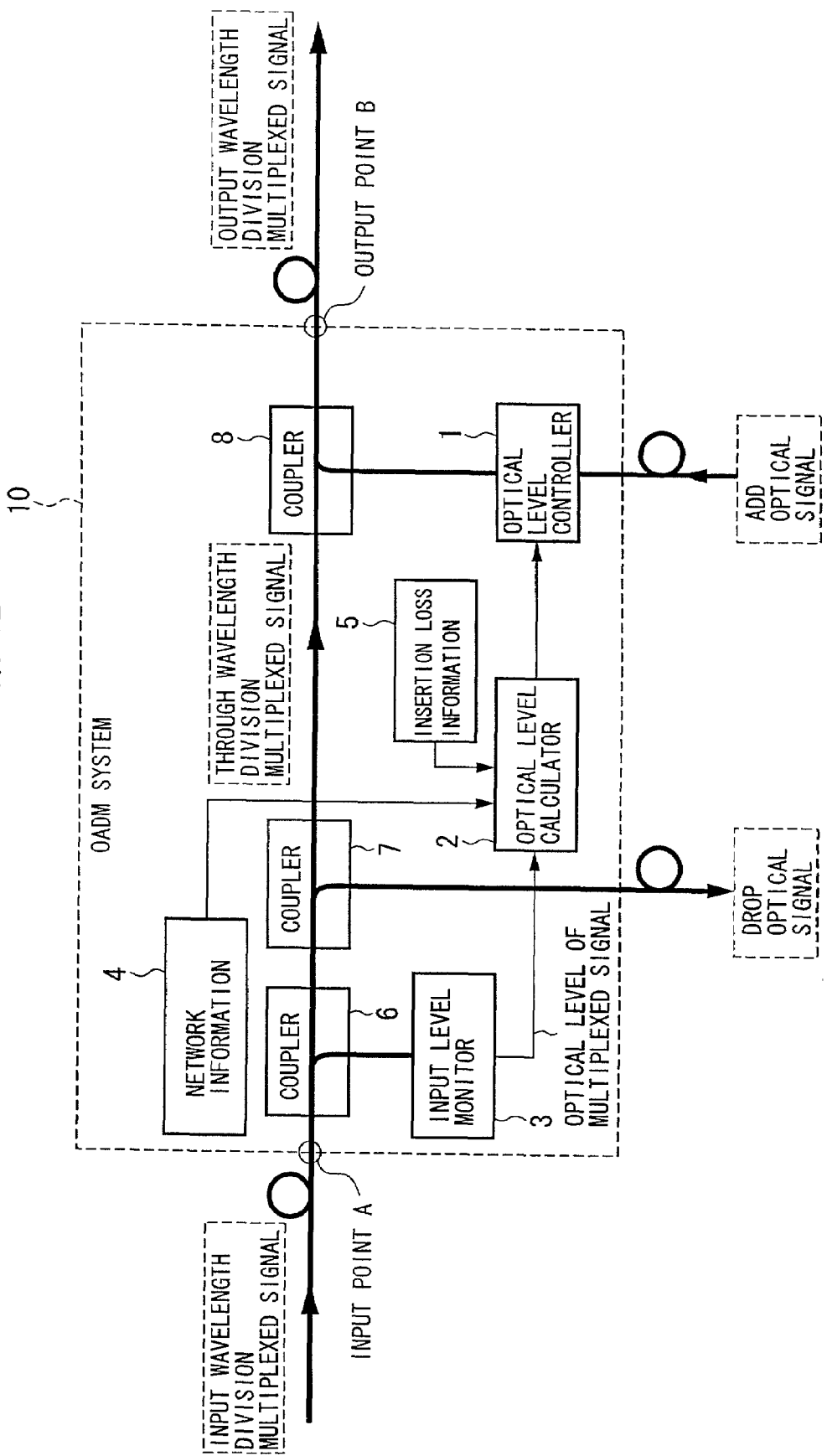
FIG. 2 is a block diagram for showing a first embodiment of an OADM system according to the present invention.

FIG. 2 is a block diagram for showing an OADM system relating to a first embodiment of the present invention. The present embodiment calculates optical powers of individual wavelengths of a through wavelength division multiplexed signal in an optical level calculator 2 based on an input level monitor 3, network information 4, and an insertion loss information 5, and obtains an optimal level for an add signal. The optical level controller 1 controls the power of add optical signal to an optimal level, and multiplexes the through wavelength division multiplexed signal and the add optical signal based on the calculated result.

The OADM system 10 of the present invention is constituted while including the optical level controller 1 for controlling the optical level, the optical level calculator 2 for calculating the optical level, the input level monitor 3 for monitoring an input level, the network information 4, the insertion loss information 5, and couplers 6 to 8 as shown in FIG. 2.

The following section describes an operation of the present OADM system. An optical signal (an input wavelength division multiplexed signal) is entered from input point A. The coupler 6 divides the input wavelength division multiplexed signal mostly to the coupler 7 and partly to the input level monitor 3 for monitoring respectively, and the input level monitor 3 measures an optical level of the input wavelength division multiplexed signal at the input point A. The coupler 7 divides the input wavelength division multiplexed signal into a through wavelength division multiplexed signal and a divided optical signal. The coupler 8 combines the through wavelength division multiplexed signal with the add optical signal. At this time, the optical level controller 1 controls the add optical signal to the control value calculated by the optical level calculator 2. Finally, an output point B provides the combined optical signal as an output wavelength division multiplexed signal.

The following section describes calculation of the control value in the optical level controller 1. The optical level calculator 2 uses three types of information comprising the network information 4, the input level monitor 3, and the insertion loss information 5 to calculate the control value for optical level controller 1.

Figure 3:
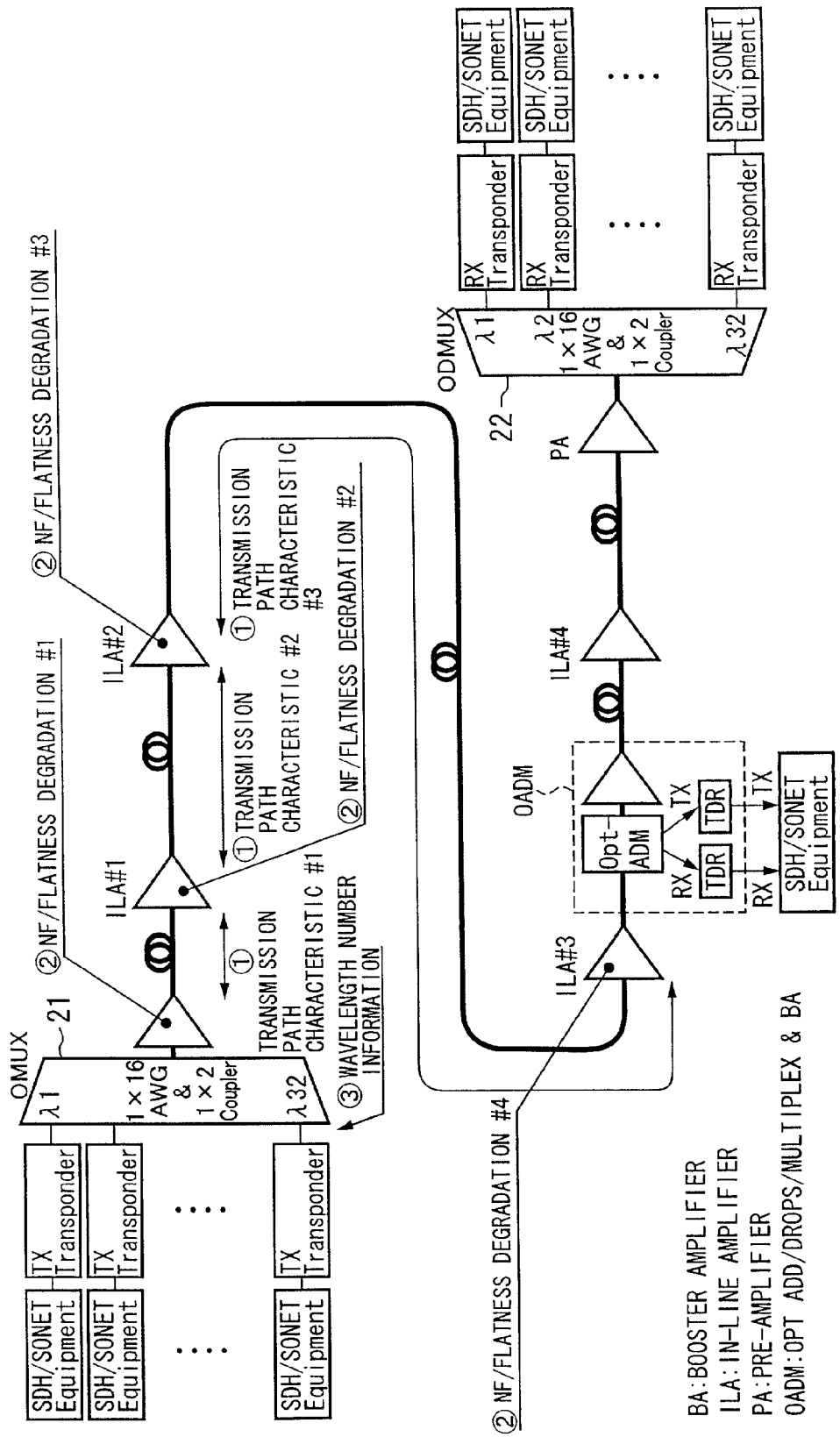
FIG. 3 is a block diagram for showing one example of an optical wavelength division multiplex transmission system.

The network information 4 means (1) transmission line characteristics (a transmission line length, a transmission line loss, and a fiber characteristic), (2) a characteristic of an optical amplifier installed on an OADM upstream station (NF (Noise Figure)/flatness degradation), and (3) wavelength number as shown in a constitution drawing of one example of optical wavelength division multiplex transmission system in FIG. 3. Note that FIG. 3 is an example of a typical optical wavelength division multiplex transmission system. The input level monitor 3 is a monitor for the optical level [dBm] of input wavelength division multiplexed signal at the input point A. The insertion loss information 5 (an insertion loss [dB] of a through wavelength from the input point A to the output point B) is information specific to a device, and is stored as the insertion loss information 5 measured during manufacturing. The optical level controller 1 controls the optical level of add optical signal to the control value calculated by the optical level calculator 2.

FIG. 3 shows that the transmission line characteristics and the characteristic of optical amplifier are characteristics on a transmission line between a multiplexer (OMUX) 21 and a demultiplexer (ODMUX) 22, and the wavelength number information is information on number of wavelengths multiplexed in the multiplexer 21.

Figure 4:
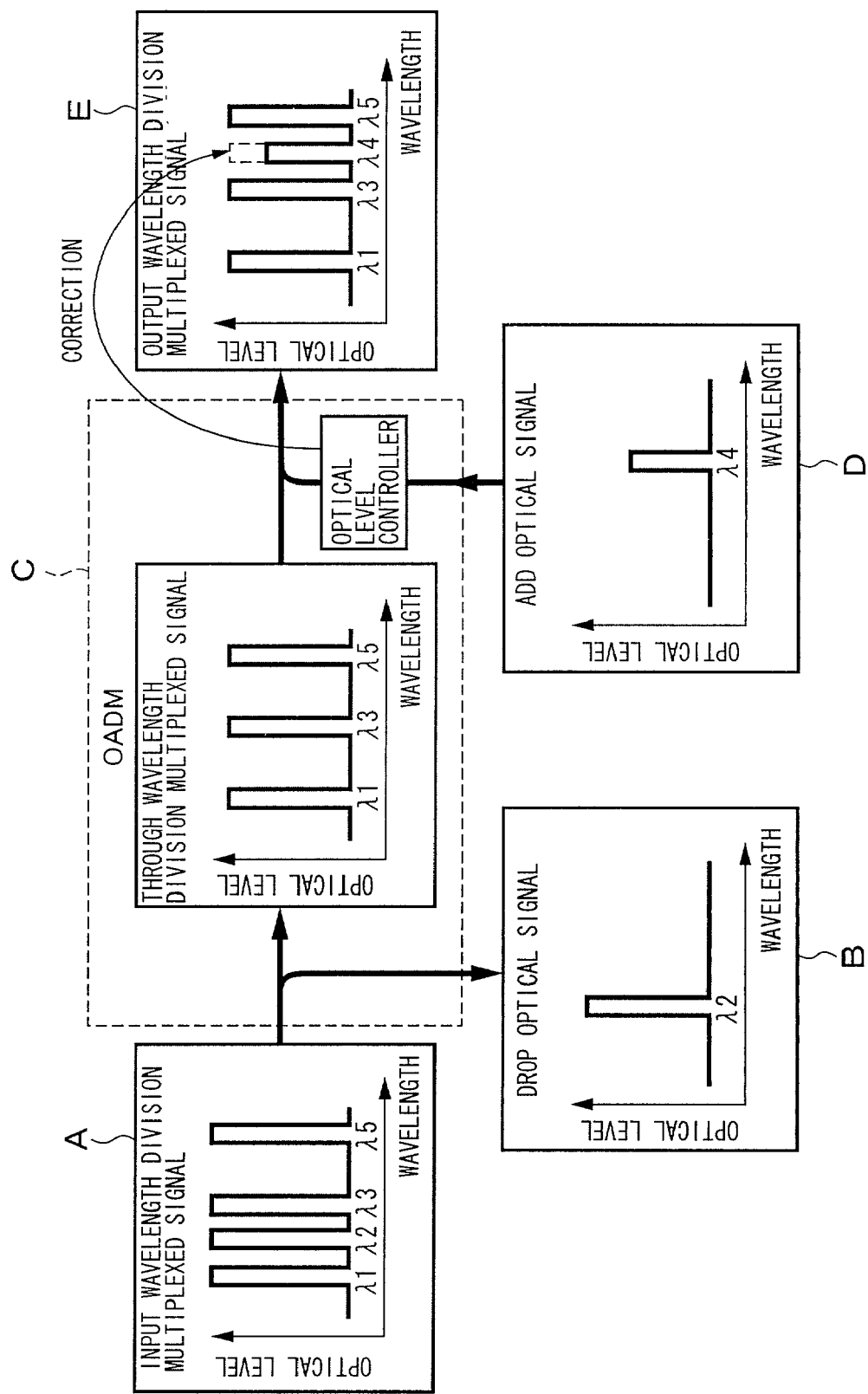
FIG. 4 is a drawing for showing optical levels of individual signals of wavelength division multiplex transmission.

The following section describes necessity of the optical level controller 1 while referring to FIG. 4. FIG. 4 is a drawing for showing an add operation and a drop operation to the multiplexed signal. The following section describes the optical level in a case where an input wavelength division multiplexed signal includes four waves, $\lambda 1$ to $\lambda 3$ and $\lambda 5$ (See block A in FIG. 4), and the OADM drops $\lambda 2$ (See block B in FIG. 4), adds $\lambda 4$ (See block D in FIG. 4) to the remaining input wavelength division multiplexed signal including $\lambda 1$, $\lambda 3$ and $\lambda 5$ (See block C in FIG. 4), and provides an output wavelength division multiplexed signal including $\lambda 1$, and $\lambda 3$ to $\lambda 5$ (See block E in FIG. 4) as an example.

FIG. 4 shows optical levels of the individual signals of wavelength division multiplex transmission, and positions protruding upwards indicate signal light. The input wavelength division multiplexed signal including $\lambda 1$, $\lambda 2$, $\lambda 3$, and $\lambda 5$ is divided into $\lambda 1$, $\lambda 3$, and $\lambda 5$, and $\lambda 2$, and only $\lambda 2$ is provided as a drop optical signal. $\lambda 1$, $\lambda 3$, and $\lambda 5$ are wavelengths passing through the OADM (the through wavelength division multiplexed signal), and are combined with an add signal $\lambda 4$, and are provided as a signal wavelength division multiplexing $\lambda 1$, $\lambda 3$, $\lambda 4$, and $\lambda 5$ (the output wavelength division multiplexed signal). If $\lambda 4$ is inserted without the power control, and $\lambda 4$ is lower in the power level than the other wavelengths in the through wavelength division multiplexed signal, it is known that a cross talk from $\lambda 4$ to $\lambda 1$, $\lambda 3$, and $\lambda 5$ in the through wavelength division multiplexed signal exert an adverse effect on receiving the other wavelengths in the through wavelength division multiplexed signal. Thus, it is necessary to meet an added power of $\lambda 4$ to the levels of the other wavelengths in the through wavelength division multiplexed signal, and to correct it into a range which does not generate the effect of the cross talk.

Figure 5:
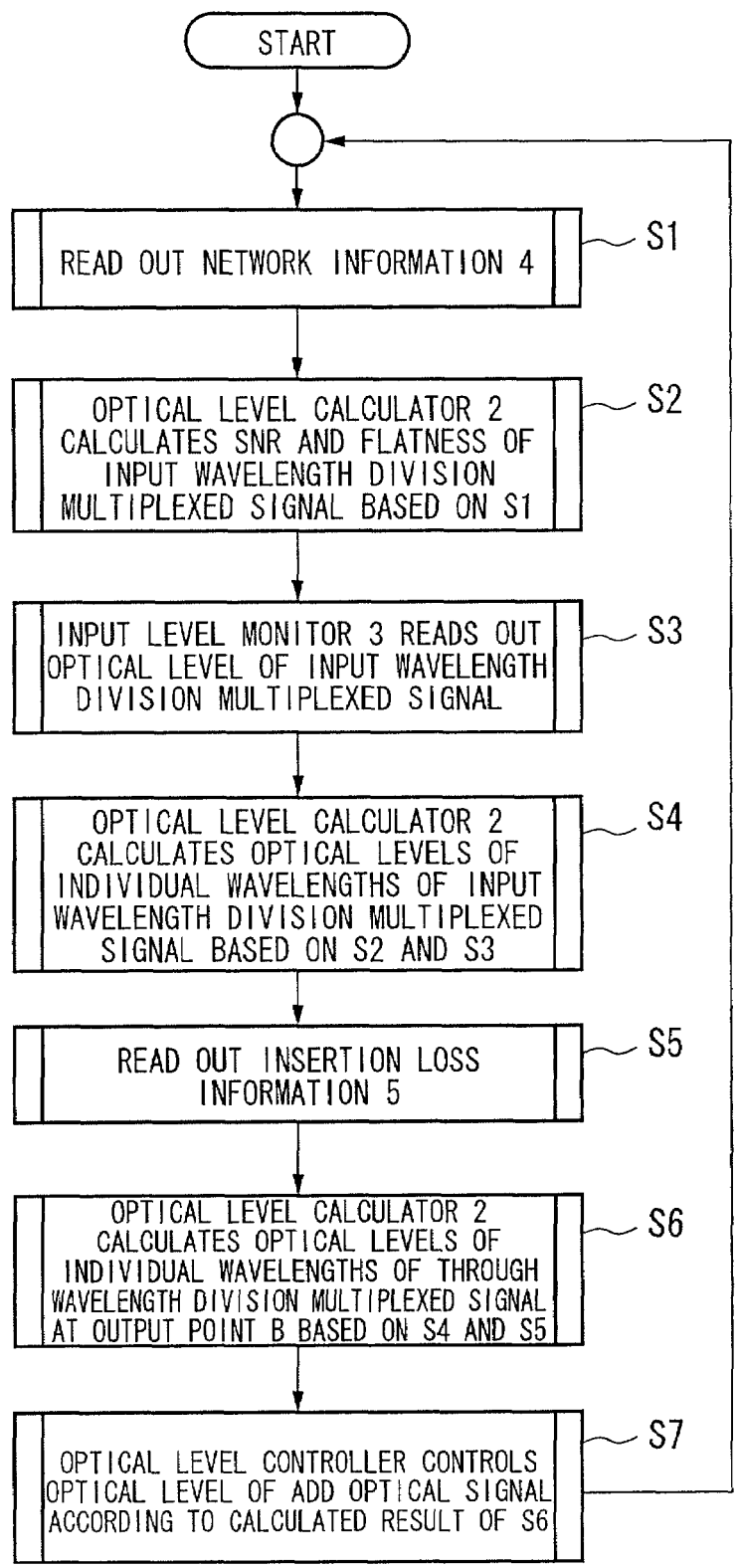
FIG. 5 is a flowchart for showing an operation of a first embodiment.

The following section further describes the operation of first embodiment while using a flowchart in FIG. 5. First, the optical level calculator 2 reads out the transmission line characteristics (the transmission line length, the transmission line loss, and the fiber characteristic), the characteristic (Noise Figure/flatness degradation) of optical amplifier, and the wavelength number information from the network information 4 (Step S1), and calculates an SNR (Signal to Noise Ratio) and a flatness of the input wavelength division multiplexed signal at the point A based on these three types of information (Step S2).

The input level monitor 3 reads out the optical level of input wavelength division multiplexed signal at input point A (Step 3), and the optical level calculator 2 calculates the optical levels of individual wavelengths of input wavelength division multiplexed signal at the input point A based on this optical level, and the SNR and the flatness of input wavelength division multiplexed signal obtained in Step 2 (Step 4).

Then, the optical level calculator 2 reads out the insertion loss from the insertion loss information 5 (Step 5).

Then, the optical level calculator 2 calculates optical levels of individual wavelengths of the through wavelength division multiplexed signal at the output point B based on information on the insertion loss, and the optical levels of individual wavelengths obtained in Step S4 (Step S6).

Then, the optical level controller 1 controls the optical level of add optical signal according to the calculated result of optical level calculator 2 (Step S7).

Then, the procedure returns to the processing in Step S1, and Step S1 to S7 are processed periodically.

Repeating the process periodically in this way adapts to a time series change, and always multiplexes the add optical signal and the through wavelength division multiplexed signal at the optimal level.

Because a person skilled in the art well knows the calculation of SNR and the flatness of input wavelength division multiplexed signal by the optical level calculator 2 from the network information 4 in Step S2, and the calculation is irrelevant to the present invention, the detailed constitution thereof is suppressed.

Figure 6:
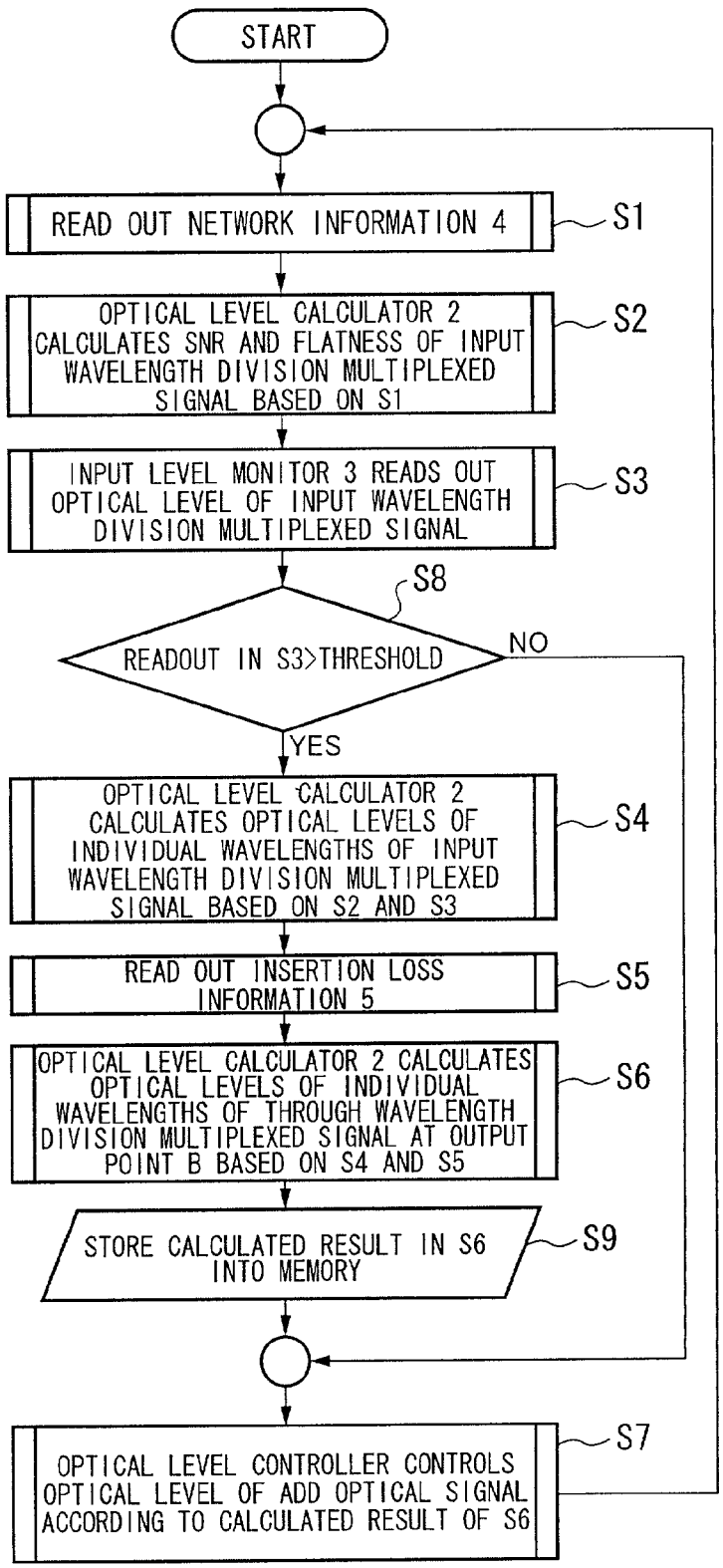
FIG. 6 is a flowchart for showing an operation of a second embodiment.

The following section describes a second embodiment of the present invention while referring to FIG. 6. FIG. 6 is a flowchart for showing an operation of the OADM system according to the second embodiment. Because the constitution of second embodiment is similar to FIG. 2, FIG. 3, and FIG. 4 which show the constitution of the first embodiment, drawings of the constitution and a detailed description are suppressed for the second embodiment.

While the first embodiment assumes a case where the input wavelength division multiplexed signal light is present, there may exist a case where the input wavelength division multiplexed signal light is not present because of a certain failure. Comparing (Step S8) and storing (Step S9) are added in FIG. 6, a description is added for cases where the process proceeds to Step S4, or jumps to Step S7 based on the result of comparing (Step S8). Because the processes in Step S1 to S3, S4 to S6, and S7 are equivalent to those in the first embodiment, the description for them is suppressed.

First, the following section describes process after Step S3 when the input wavelength division multiplexed signal is present. When a readout of the optical level of input wavelength division multiplexed signal exceeds a certain threshold in the process for comparing (Step S8), the process proceeds to Step S4 and the following as described in the first embodiment. However, the optical levels of individual wavelengths calculated in Step S6 are stored in a memory suppressed from the drawing (provided in the optical level calculator 2 or the optical level controller 1, for example) in Step S9 in the second embodiment. As a result, the calculated result is always stored in the memory.

The following section describes the processing following Step 3 when there exists no input wavelength division multiplexed signal. When the readout of optical level of input wavelength division is equal to or less than the certain threshold in the comparing processing (Step S8), the procedure jumps to Step S7. The optical level controllers 1 refers to the values stored in Step S9 for the optical level control for add signal, and the values when there existed the input wavelength division multiplexed signal are used as described before.

As a result, when the input wavelength division multiplexed signal light is off because of a failure, the add signal light is controlled to an optimal level, and transmission of the add signal light is ensured. Because the add signal light is set such that it is optimal when there exists input light, there is not a mutual adverse effect when the input wavelength division multiplexed signal recovers.

Thus, according to the present invention, the scale of a circuit and the number of parts can be reduced.

Specifically, because three types of information comprising the network information 4, the input level monitor 3, and the insertion loss information 5 is used to calculate the control value for add optical signal, it is not necessary to divide the through wavelength division multiplexed signal into the individual wavelengths, and it is possible to multiplex the through signal and the add signal while the through signal remains as a multiplexed optical signal. As a result, dividing the through wavelength division multiplexed signal, an optical device for multiplexing, and monitor circuits for individual wavelengths are not necessary, and the cost is reduced. Because the number of parts reduces, the reliability of system increases, and the failure rate decreases.

Further, because the periodical processing adapts to the time series change of transmission state, the add signal light is always set to an optimal level.

What is claimed is:

1. An add signal level setting device for an OADM (Optical Add-Drop Multiplexer) comprising:
   an optical level calculator which receives information and uses said information for calculating optical levels of individual wavelengths of an input wavelength division multiplexed signal which is input to said OADM, without demultiplexing said input wavelength division multiplexed signal into the individual wavelengths; and
   an optical level controller for controlling an optical level of an add signal which is added to said input wavelength division multiplexed signal, according to the calculated optical levels of individual wavelengths.

2. The add signal level setting device according to claim 1, wherein said information comprises network information on an optical wavelength division multiplex transmission system including said OADM, an optical level of said input wavelength division multiplexed signal, and insertion loss information for a through wavelength in a transmission line between an input and an output in said OADM to calculate the optical levels of individual wavelengths.

3. The add signal level setting device according to claim 2, wherein said network information comprises transmission line characteristics, a characteristic of an optical amplifier installed in an OADM upstream station, and wavelength information.

4. The add signal level setting device according to claim 1, wherein said optical level calculator comprises:
   a determining part for determining whether the optical level of said input wavelength division multiplexed signal exceeds a predetermined threshold; and
   a storing part for storing the calculated optical levels of individual wavelengths into a memory, said optical level controller controlling the optical level of said add signal according to the optical levels of individual wavelengths stored in said memory.

5. The add signal level setting device according to claim 4, wherein said optical level controller conducts the control after said storing part conducts the storing, when said determining part determines that the optical level of said input wavelength division multiplexed signal exceeds the predetermined threshold.

6. The add signal level setting device according to claim 4, wherein said optical level controller uses a previously calculated result already stored in said memory to conduct the control without conducting said storing, when said determining part determines that the optical level of said input wavelength division multiplexed signal is equal to or less than the predetermined threshold.

7. The add signal level setting device according to claim 1, further comprising:
   a first coupler for separating said input wavelength division multiplexed signal into a through wavelength division multiplexed signal and a divided optical signal.

8. The add signal level setting device according to claim 7, further comprising:
   an input monitor for measuring the optical level of the input wavelength division multiplexed signal, and outputting said optical level of the input wavelength division multiplexed signal to said optical level calculator.

9. The add signal level setting device according to claim 8, further comprising:
   a second coupler which receives said input wavelength division multiplexed signal and divides said input wavelength division multiplexed signal mostly to said first coupler, and partly to said input monitor.

10. The add signal level setting device according to claim 9, further comprising:
    a third coupler which receives said through wavelength division multiplexed signal from said second coupler, and combines the through wavelength division multiplexed signal and the add signal.

11. The add signal level setting device according to claim 10, wherein said optical level calculator calculates a signal to noise ratio and flatness of said input wavelength division multiplexed signal based on network information.

12. The add signal level setting device according to claim 11, wherein said optical level calculator calculates said optical levels of said individual wavelengths of said input wavelength division multiplexed signal based on said signal to noise ratio and said flatness of said input wavelength division multiplexed signal and an optical level of said input wavelength division multiplexed signal.

13. The add signal level setting device according to claim 12, wherein said optical level calculator calculates optical levels of individual wavelengths of said through wavelength division multiplexed signal at an output point, based on said optical levels of said individual wavelengths of said input wavelength division multiplexed signal and insertion loss information.

14. The add signal level setting device according to claim 1, wherein said optical levels of said individual wavelengths are calculated based at least upon an optical level of said input wavelength division multiplexed signal.

15. The add signal level setting device according to claim 1, further comprising:
    an input monitor which measures said optical level of the input wavelength division multiplexed signal, and outputs said optical level of the input wavelength division multiplexed signal to said optical level calculator.

16. The add signal level setting device according to claim 1, wherein said optical level calculator calculates said optical levels of said individual wavelengths based on whether said optical level of said input wavelength division multiplexed signal exceeds a predetermined threshold.

17. The add signal level setting device according to claim 1, wherein said add signal comprises a signal to be added to said input wavelength division multiplexed signal in said OADM.

18. The add signal level setting device according to claim 1, wherein said optical level calculator and said optical level controller are included in said OADM.

19. The add signal level setting device according to claim 1, wherein said add signal is to be added to said input wavelength division multiplexed signal by the OADM, and
wherein a wavelength division multiplexed signal output by said OADM comprises said add signal a power of which has been controlled by said optical level controller.

20. The add signal level setting device according to claim 1, wherein said input wavelength division multiplexed signal comprises a plurality of individual wavelengths, and
wherein said optical level calculator calculates a plurality of optical levels which correspond respectively to said plurality of individual wavelengths.

21. The add signal level setting device according to claim 1, wherein said add signal is input to said optical level controller.

22. The add signal level setting device according to claim 1, wherein said optical level controller outputs said add signal having an optical level which has been controlled according to the calculated optical levels of individual wavelengths.

23. The add signal level setting device according to claim 1, wherein said optical level controller is coupled to said optical level calculator and receives said calculated optical levels of individual wavelengths from said optical level calculator.

24. An add signal level setting method for an OADM (Optical Add-Drop Multiplexer) comprising:
calculating optical levels of individual wavelengths of an input wavelength division multiplexed signal which is input to said OADM using received information, without demultiplexing said input wavelength division multiplexed signal into the individual wavelengths; and
controlling an optical level of an add signal which is added to said input wavelength division multiplexed signal, according to the calculated optical levels of individual wavelengths.

25. The add signal level setting method according to claim 24, wherein said information comprises network information on an optical wavelength division multiplex transmission system including said OADM, an optical level of said input wavelength division multiplexed signal, and insertion loss information for a through wavelength in a transmission line between an input and an output in said OADM to calculate the optical levels of individual wavelengths.

26. The add signal level setting method according to claim 25, wherein said network information comprises transmission line characteristics, a characteristic of an optical amplifier installed in an OADM upstream station, and wavelength information.

27. The add signal level setting method according to claim 24, wherein said calculating said optical levels comprises:
determining whether the optical level of said input wavelength division multiplexed signal exceeds a predetermined threshold; and
storing the calculated optical levels of individual wavelengths into a memory,
wherein said controlling of the optical level controls the optical level of an add signal according to the optical levels of individual wavelengths stored in said memory.

28. The add signal level setting method according to claim 27, wherein said controlling of said optical level is performed after said storing the calculated optical levels, when the optical level of said input wavelength division multiplexed signal is determined to exceed the predetermined threshold.

29. The add signal level setting method according to claim 27, wherein said controlling of the optical level uses a previously calculated result already stored in said memory to conduct the control without conducting said storing, when the optical level of said input wavelength division multiplexed signal is determined to be equal to or less than the predetermined threshold.

30. An add signal level setting device, comprising:
a coupler which divides an input wavelength division multiplexed (WDM) signal which is input to an Optical Add-Drop Multiplexer (OADM) into a plurality of signals;
an optical level calculator which receives information and one of said plurality of signals and calculates optical levels of individual wavelengths of said input WDM signal using said information; and
an optical level controller for controlling an optical level of an add signal which is added to said input wavelength division multiplexed signal, according to the calculated optical levels of individual wavelengths.

* * * * *